United States Patent [19]

Paulik

[11] 4,153,958
[45] May 15, 1979

[54] COMPACT SEATING AND BED ARRANGEMENT

[76] Inventor: John B. Paulik, 1201 SE. Walnut Ave., Apt. 18, Tustin, Calif. 92680

[21] Appl. No.: 839,018

[22] Filed: Oct. 3, 1977

[51] Int. Cl.² ............................................... A47C 7/02
[52] U.S. Cl. ........................................ 5/12 R; 5/453;
5/465; 297/118; 297/456
[58] Field of Search .................... 5/12, 349, 350, 352,
5/357; 297/17, 118, 456

[56] References Cited

U.S. PATENT DOCUMENTS

| 2,631,699 | 3/1953 | Schultz | 297/17 |
| 3,309,134 | 3/1967 | Roberts | 297/17 |
| 3,379,472 | 4/1968 | Hilfiker | 297/118 |
| 3,420,574 | 1/1969 | Smith | 297/456 |
| 3,902,759 | 9/1975 | Monteforte | 297/456 |

FOREIGN PATENT DOCUMENTS 850936 9/1952 Fed. Rep. of Germany ........... 297/456

Primary Examiner—Casmir A. Nunberg
Attorney, Agent, or Firm—Jackson & Jones

[57] ABSTRACT

A compact case containing two compartments, one of which stows an inflatable bed and the other of which stows an inflatable high-back seat. The seat and bed are shaped to gain support from the case when in an inflated condition, and the seat includes interior bracing sections to properly support a person in a seating position. The device is designed to be particularly useful in conjunction with recreation vehicles.

8 Claims, 6 Drawing Figures

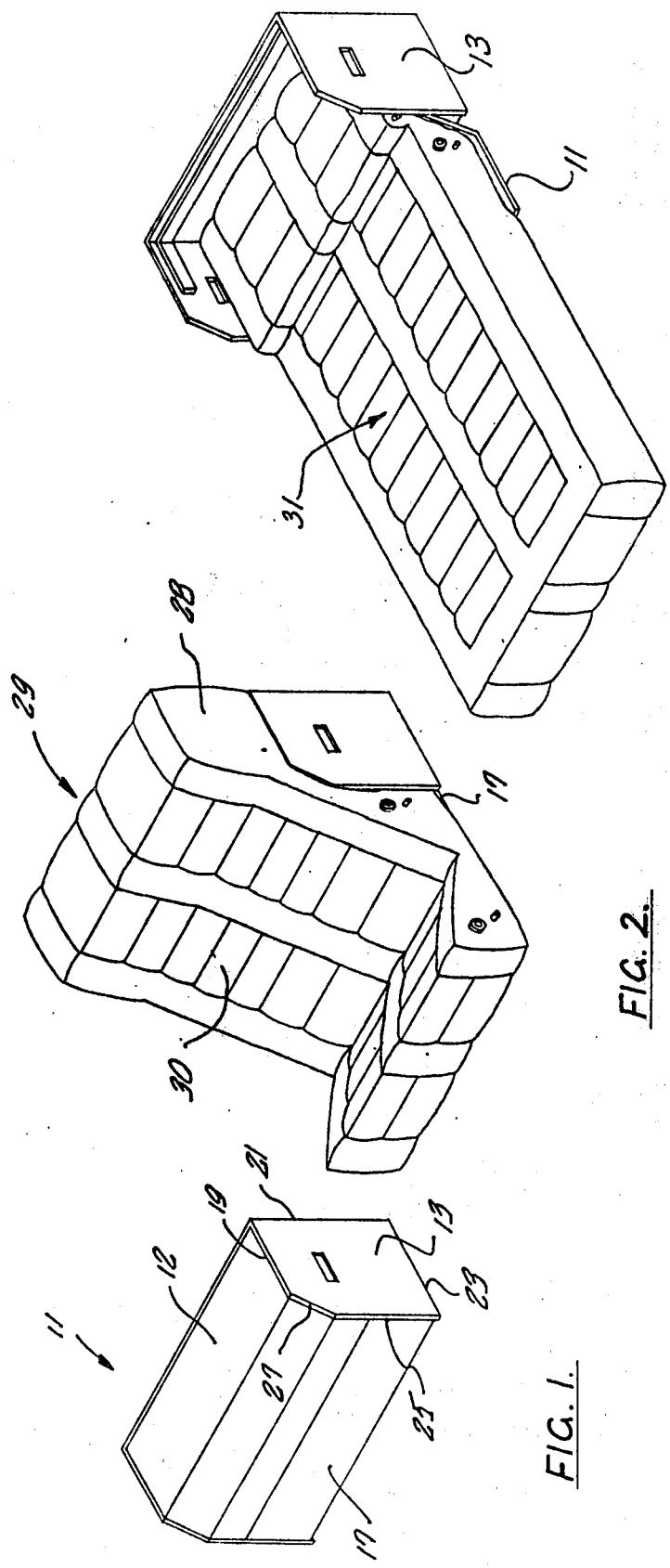

COMPACT SEATING AND BED ARRANGEMENT

BACKGROUND OF THE INVENTION

The subject invention relates to portable furniture and particularly to a compact portable unit providing a convertible bed and seating arrangement.

Recreation vehicles with interior furniture are becoming increasingly popular. However, the limited space in such vehicles has meant that if permanent furniture is used, other uses of the interior are severely restricted. It has become apparent to this inventor that a compact, collapsible bedding and seating arrangement would be highly desirable, particularly when adapted to the space-conversing needs of recreation vehicles, such as vans and campers. While furniture employing collapsible or inflatable cushions has been known, an apparatus providing an inflatable bed and seating arrangement and adapted to fit in a compact case has not been provided.

SUMMARY OF THE INVENTION

It is therefore an object of the invention to provide an improved piece of inflatable furniture.

It is another object of the invention to provide a compact inflatable bed and seating arrangement which may be easily stowed in a compact space-saving case.

It is yet another object of the invention to provide an inflatable high-back seat which may properly support persons sitting thereon.

These and other objects and advantages of the invention are accomplished by providing a compact case having first and second compartments therein. In each compartment is respectively stored an inflatable bed and an inflatable seat. The seat and bed are configured so that they may be alternately removed from the case and are shaped to cooperate with the case structure to provide proper support. Advantages of the invention include compact size, lightness in weight, easy operability, and functional design.

BRIEF DESCRIPTION OF THE DRAWINGS

The preferred embodiment and best mode for practicing the just summarized invention will now be described in detail in conjunction with the drawings of which:

FIG. 1 is a perspective view of the compact case according to the preferred embodiment of the invention.

FIG. 2 illustrates in perspective the preferred embodiment of the invention configured as a high-back seat.

FIG. 3 illustrates in perspective the preferred embodiment of the invention configured as a bed.

DETAILED DESCRIPTION OF THE PREFERRED EMBODIMENT OF THE INVENTION

Figure 5:
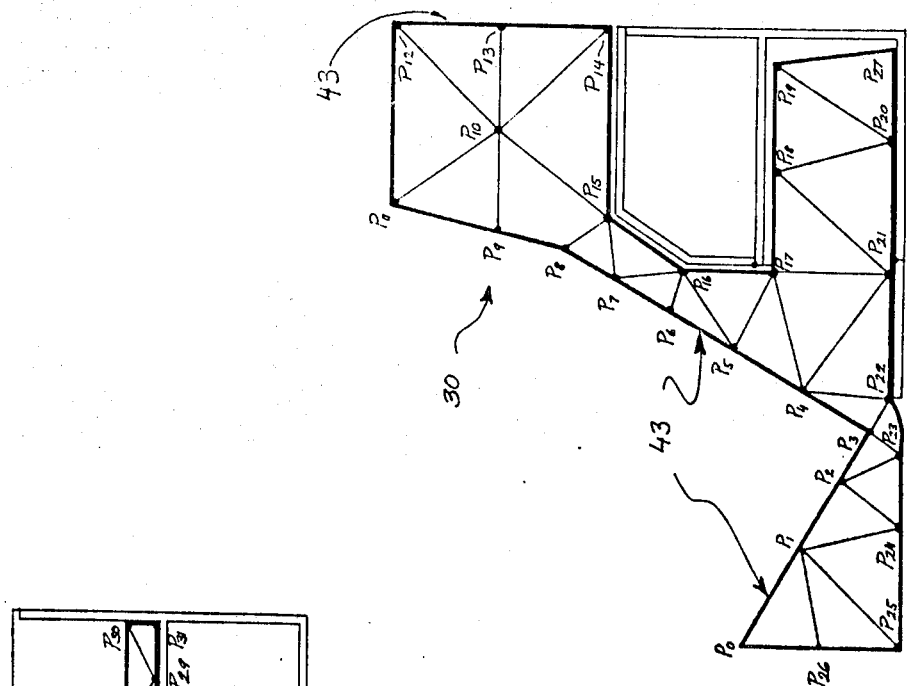
FIG. 5 illustrates in cross-section the internal structure of the seat of the preferred embodiment of the invention.

FIGS. 1-3 illustrate the preferred embodiment of the invention in general. FIG. 1 illustrates a compact housing 11 for enclosing a bedding and seating arrangement. The housing 11 includes two side plates 13, a first pivotable cover 12 attached by means by hinges 15 and a second pivotable cover 17. The side plates 13 are identically-shaped, and the perimeter of each includes four edges 19, 21, 23, and 25 which make right angles with one another. A fifth edge 27 is formed on the pivotable cover 11 to make obtuse angles to its adjacent edges 19, 25. The cover shape produced by the angle of the edge 27 is utilized to assist in supporting the inflatable seat as will hereinafter be described. Except for the angulation produced by the shape of the cover 12, the housing 11 is substantially box-shaped.

FIG. 2 illustrates the preferred embodiment with the cover 17 in an open position to allow inflation of an inflatable seat 29. The seat 29 includes a bench-shaped seating surface 30 closed by substantially parallel sides, one 28 of which is illustrated in FIG. 2.

FIG. 3 illustrates the housing 11 of FIG. 1 with the cover 11 opened and an inflatable bed 31 therein revealed and inflated. As may be noted from FIG. 2 and FIG. 3, the housing 11 may have its back edge 21 placed against a surface, for example the side of a van or camper. In such a position, either the bed 31 or the seat 29 may be easily removed and inflated in a surface area normally dedicated to other uses.

Figure 4:
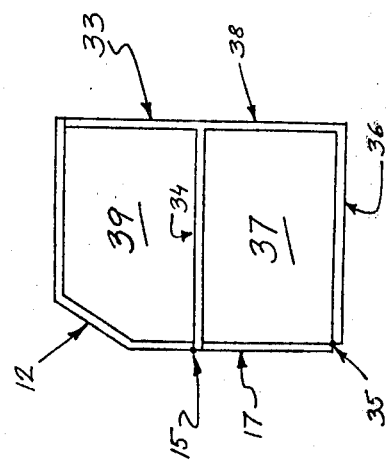
FIG. 4 illustrates in cross-section and compact case of the preferred embodiment of the invention.

The housing 11 is shown in cross-section in FIG. 4. There it may be seen that a frame member 33 is provided which cooperates with the cover 12 and cover 17 to form two compartments 37, 39 wherein the seat 29 and bed 31 are respectively stowed. The frame member 33 includes two parallel, horizontal, substantially planar surfaces extending from a vertical member 38. The vertical member 38 is rectangular as are the horizontal surfaces 34, 36. Also illustrated is the hinge 35 for the bottom cover 17. The covers may be held closed by various known latching mechanisms.

The horizontal surface 34 of the housing 11 provides a support to the inflatable pillow 32 of the bed 31. The internal structure of the seat 39 and bed 31 is somewhat complicated to provide proper support. For example, the seat 29 should be capable of comfortably supporting a person in a sitting position. However, merely constructing the seat 29 as a single inflatable member, much like a balloon, fails to meet this requirement because of the displacement of air caused when a person sits down.

To provide proper seat support, the structure of FIG. 5 is provided. This structure includes an outer plastic surface and an interior rib supporting structure. The ribs 41 on the interior are sealably attached to the peripheral edge 43 at the points indicated $P_1 \ldots P_n$ but not to the sides 28 of the chair member. The ribs 41 are positioned to counteract forces created when a person sits in the chair. The ribs 41 and edges 43 may be plastic sealed by conventional techniques. Alternatively the ribs 41 may be a fabric material and the edges 43 may be rubber-coated fabric.

As may be noted, the seat 29 is shaped to fit around the upper box compartment 39. The cover 12 cooperates to provide additional support for the seat 29.

Figure 6:
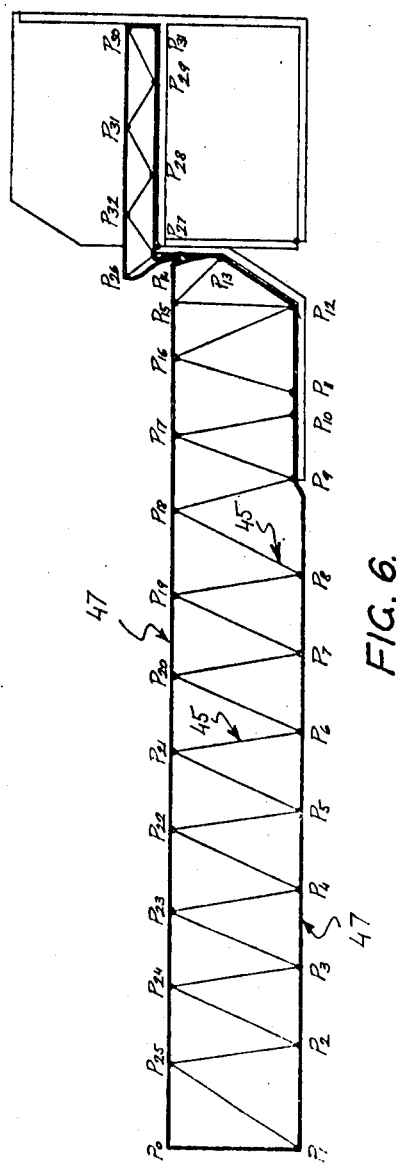
FIG. 6 illustrates in cross-section the internal structure of the bed of the preferred embodiment.

In the embodiment of FIG. 5, the seat 29 may either be one single air space or sections of the seat 29 may be isolated and separately filled with air to provide further stabilization. The bed structure of FIG. 6 including ribs 45 and edges 47 is constructed similar to the seat 29. Tables listing exemplary dimensions of a practical seat 29 and bed 31 configured according to the preferred embodiment are as follows:

TABLE I

AIR INFLATABLE SEAT (FIG. 5)

| | | | | | |
|---|---|---|---|---|---|
| $P_1P_{26}$ | = | 6 inches | $P_9P_{10}$ | = | 6-½ inches |
| $P_1P_{25}$ | = | 9 inches | $P_9P_{11}$ | = | 7 inches |
| $P_1P_{24}$ | = | 7 inches | $P_{10}P_{11}$ | = | 8-¼ inches |
| $P_1P_2$ | = | 5-¼ inches | $P_{10}P_{12}$ | = | 9-¼ inches |
| $P_1P_0P_{26}$ | = | 7+5 inches | $P_{10}P_{13}$ | = | 6-½ inches |
| $P_2P_{24}$ | = | 5 inches | $P_{10}P_{14}$ | = | 10 inches |
| $P_2P_{23}$ | = | 4-½ inches | $P_{10}P_{15}$ | = | 9 inches |
| $P_2P_3$ | = | 3-¾ inches | $P_{11}P_{12}$ | = | 11 inches |
| $P_3P_{23}$ | = | 2-½ inches | $P_{12}P_{13}$ | = | 7 inches |
| $P_3P_4$ | = | 5 inches | $P_{13}P_{14}$ | = | 7 inches |
| $P_3P_{22}$ | = | 3 inches | $P_{14}P_{15}$ | = | 11-¾ inches |
| $P_4P_{22}$ | = | 6 inches | $P_{15}P_{16}$ | = | 7-½ inches |
| $P_4P_{21}$ | = | 10 inches | $P_{16}P_{17}$ | = | 5-¼ inches |
| $P_4P_{17}$ | = | 8 inches | $P_{17}P_{21}$ | = | 8 inches |
| $P_4P_5$ | = | 5 inches | $P_{17}P_{18}$ | = | 6-½ inches |
| $P_5P_{17}$ | = | 6 inches | $P_{18}P_{21}$ | = | 10-½ inches |
| $P_5P_{16}$ | = | 6 inches | $P_{18}P_{20}$ | = | 8-¼ inches |
| $P_5P_6$ | = | 5 inches | $P_{18}P_{19}$ | = | 6-½ inches |
| $P_6P_{16}$ | = | 3-¼ inches | $P_{19}P_{27}P_{20}$ | = | 8 + 6 inches |
| $P_6P_7$ | = | 4-¼ inches | $P_{19}P_{20}$ | = | 9 inches |
| $P_7P_{16}$ | = | 5 inches | $P_{20}P_{21}$ | = | 8-½ inches |
| $P_7P_{15}$ | = | 5 inches | $P_{21}P_{22}$ | = | 8 inches |
| $P_7P_8$ | = | 4 inches | $P_{22}P_{23}$ | = | 4 inches |
| $P_8P_{15}$ | = | 3 inches | $P_{23}P_{24}$ | = | 5 inches |
| $P_8P_9$ | = | 6 inches | $P_{24}P_{25}$ | = | 8 inches |
| | | | $P_{25}P_{26}$ | = | 5-¼ inches |

TABLE II

AIR INFLATABLE BED (FIG. 6)

| | | | | | |
|---|---|---|---|---|---|
| $P_1P_0P_{26}$ | = | 9+5-¼ inches | $P_{11}P_{12}$ | = | 6 inches |
| $P_1P_{25}$ | = | 10 inches | $P_{12}P_{16}$ | = | 9 inches |
| $P_1P_2$ | = | 7-¼ inches | $P_{12}P_{15}$ | = | 8 inches |
| $P_2P_{25}$ | = | 9 inches | $P_{12}P_{13}$ | = | 5-¼ inches |
| $P_2P_{24}$ | = | 9 inches | $P_{13}P_{15}$ | = | 5 inches |
| $P_2P_3$ | = | 5 inches | $P_{13}P_{14}$ | = | 3-¾ inches |
| $P_3P_{24}$ | = | 9 inches | $P_{14}P_{15}$ | = | 2-¾ inches |
| $P_3P_{23}$ | = | 9 inches | $P_{14}P_{26}$ | = | 5-¼ inches |
| $P_3P_4$ | = | 5 inches | $P_{13}P_{27}$ | = | 7 inches |
| $P_4P_{23}$ | = | 9 inches | $P_{15}P_{16}$ | = | 3-½ inches |
| $P_4P_{22}$ | = | 9 inches | $P_{16}P_{17}$ | = | 5 inches |
| $P_4P_5$ | = | 5 inches | $P_{17}P_{18}$ | = | 5 inches |
| $P_5P_{22}$ | = | 9 inches | $P_{18}P_{19}$ | = | 5 inches |
| $P_5P_{21}$ | = | 9 inches | $P_{19}P_{20}$ | = | 5 inches |
| $P_5P_6$ | = | 5 inches | $P_{20}P_{21}$ | = | 5 inches |
| $P_6P_{21}$ | = | 9 inches | $P_{21}P_{22}$ | = | 5 inches |
| $P_6P_{20}$ | = | 9 inches | $P_{22}P_{23}$ | = | 5 inches |
| $P_6P_7$ | = | 5 inches | $P_{23}P_{24}$ | = | 5 inches |
| $P_7P_{20}$ | = | 9 inches | $P_{24}P_{25}$ | = | 5 inches |
| $P_7P_{19}$ | = | 9 inches | $P_{26}P_{27}$ | = | 2-½ inches |
| $P_7P_8$ | = | 5 inches | $P_{26}P_{32}$ | = | 4-¼ inches |
| $P_8P_{19}$ | = | 9 inches | $P_{27}P_{32}$ | = | 3 inches |
| $P_8P_{18}$ | = | 9 inches | $P_{27}P_{28}$ | = | 5 inches |
| $P_8P_9$ | = | 6-¾ inches | $P_{28}P_{32}$ | = | 3-½ inches |
| $P_9P_{18}$ | = | 8-¾ inches | $P_{28}P_{31}$ | = | 3-½ inches |
| $P_9P_{17}$ | = | 8 inches | $P_{28}P_{29}$ | = | 5 inches |
| $P_9P_{10}$ | = | 4 inches | $P_{29}P_{31}$ | = | 3-½ inches |
| $P_{10}P_{17}$ | = | 8-¼ inches | $P_{29}P_{30}$ | = | 3-½ inches |
| $P_{10}P_{11}$ | = | 1-¾ inches | $P_{29}P_{31}P_{30}$ | = | 3 + 2 inches |
| $P_{11}P_{16}$ | = | 8-½ inches | $P_{30}P_{31}$ | = | 6 inches |
| | | | $P_{31}P_{32}$ | = | 6 inches |

As may be seen, the preferred embodiment provides a very compact, convenient and effective combination inflatable bed and seat. The system may be operated by a compressor with a reversible connection to provide pumping for filling the plastic enclosed air spaces and sucking for rapidly emptying them. Such a compressor could be run off of the car battery. Preferably air valves providing over-inflation and over-deflation protection would be used. As may be apparent, the preferred embodiment is subject to numerous adaptations and modifications without departing from the scope and spirit of the invention. Therefore it is to be understood that, within the scope of the appended claims, the invention may be practiced other than as specifically described above.

What is claimed is:

1. An article of portable furniture comprising:
a housing providing first and second selectively openable compartments, wherein said housing includes a first support member providing a vertical back surface and first and second horizontal members spaced apart from and parallel to one another, first cover means pivotally mounted to close the space between said vertical member and said first horizontal member thereby forming said first compartment and second cover means pivotally mounted to close the space between said first and second horizontal members, thereby forming said second compartment;
means in said first compartment for forming an inflatable bed, and
means in said second compartment for forming an inflatable seat.

2. The article of portable furniture of claim 1 wherein said first cover means comprises first and second rectangular planar members angled obtusely to one another.

3. The article of portable furniture of claim 2 wherein said means for forming a seat comprises an inflatable plastic member shaped to fit in said second compartment and to rest against the first cover to thereby draw support from said first cover.

4. The article of portable furniture of claim 3 wherein said means for forming an inflatable bed includes an inflatable pillow adapted to rest on said first horizontal member when inflated and a mattress member oriented to inflate below said pillow.

5. The portable furniture of claim 1 wherein said means for forming an inflatable seat comprises:
an inflatable plastic shell adapted to inflate partially within said second compartment and to conform to the shape of said housing to derive support therefrom; and
a plurality of support ribs mounted interior to the inflatable plastic shell to provide support thereto.

6. The article of portable furniture of claim 3 wherein said means for forming an inflatable bed further comprise an inflatable plastic shell incorporating a pillow and a mattress member and a plurality of support ribs mounted interior to the inflatable plastic shell to provide support thereto.

7. An article of portable furniture comprising:
a housing frame capable of being stationed on a support surface, the housing frame having a vertical frame member and first and second horizontal frame members spaced apart from and parallel to each other;
a first cover including first, second and third rectangular planar members angled obtusely to one another, the first cover being pivotally mounted relative to the housing frame and capable of forming a first compartment by enclosing space between the vertical frame member and the first horizontal frame member, the first cover also being capable of being disposed with its third rectangular planar member lying substantially flat on and in contact with the support surface;
a second cover pivotally mounted relative to the housing frame, the second cover capable of enclosing space surrounded by the vertical frame member and by the first and second horizontal frame members thereby creating a second compartment, the second cover also capable of being disposed lying substantially flat on and in contact with the support surface;

an inflatable bed shell having a pillow and a mattress section contained in the first compartment, the inflatable shell capable of having its pillow section partially disposed within the first compartment in its inflated state, the inflated pillow section drawing support from the first horizontal frame member when the first cover is disposed with its third rectangular planar member substantially flat on the support surface, and an inflatable seat shell contained in the second compartment, the inflatable seat shell capable of being partially disposed within the second compartment in its inflated state, the inflated seat shell drawing support from the housing frame and from the first cover when the first cover is disposed to enclose space between the vertical frame member and the first horizontal frame member and when the second cover is disposed substantially flat on the support surface.

8. The portable furniture of claim 7 wherein the inflatable bed shell and the inflatable seat shell have a plurality of support ribs mounted interior to the respective shells to provide support thereto.

* * * * *

UNITED STATES PATENT AND TRADEMARK OFFICE
CERTIFICATE OF CORRECTION

PATENT NO. : 4,153,958
DATED : May 15, 1979
INVENTOR(S) : John B. Paulik

It is certified that error appears in the above—identified patent and that said Letters Patent are hereby corrected as shown below:

Column 2, line 40, delete 39 and insert 29 therein.

Signed and Sealed this

Ninth Day of October 1979

[SEAL]

Attest:

RUTH C. MASON
Attesting Officer

LUTRELLE F. PARKER
Acting Commissioner of Patents and Trademarks